United States Patent
Hui et al.

(10) Patent No.: US 7,927,723 B1
(45) Date of Patent: Apr. 19, 2011

(54) FILM STACKS TO PREVENT UV-INDUCED DEVICE DAMAGE

(75) Inventors: Angela T. Hui, Fremont, CA (US); Ning Cheng, San Jose, CA (US); Minh Van Ngo, Fremont, CA (US); Hirokazu Tokuno, Cupertino, CA (US); Wenmei Li, Sunnyvale, CA (US)

(73) Assignees: Spansion LLC, Sunnyvale, CA (US); GlobalFoundries Inc., Grand Cayman (KY)

( * ) Notice: Subject to any disclaimer, the term of this patent is extended or adjusted under 35 U.S.C. 154(b) by 0 days.

(21) Appl. No.: 11/091,524

(22) Filed: Mar. 29, 2005

(51) Int. Cl.
G02B 1/10 (2006.01)
G02B 5/28 (2006.01)
B32B 9/00 (2006.01)
B32B 19/00 (2006.01)

(52) U.S. Cl. ........ 428/701; 428/699; 428/702; 359/580; 359/586; 359/589

(58) Field of Classification Search .................. 257/436, 257/464; 428/699, 701, 702; 359/580, 586, 359/589
See application file for complete search history.

(56) References Cited

U.S. PATENT DOCUMENTS

| 6,218,292 | B1 * | 4/2001 | Foote .......................... 438/636 |
| 6,255,036 | B1 * | 7/2001 | Tanaka et al. .................. 430/313 |
| 6,294,460 | B1 * | 9/2001 | Subramanian et al. ........ 438/636 |
| 6,379,014 | B1 * | 4/2002 | Li et al. ......................... 359/614 |
| 6,410,210 | B1 * | 6/2002 | Gabriel ......................... 430/315 |
| 6,803,661 | B2 * | 10/2004 | Thakar et al. ................. 257/758 |
| 6,864,150 | B2 * | 3/2005 | Lin et al. ....................... 438/424 |
| 2003/0040179 | A1 * | 2/2003 | Thakar et al. ................. 438/689 |
| 2004/0087139 | A1 * | 5/2004 | Yeh et al. ...................... 438/636 |
| 2004/0238879 | A1 * | 12/2004 | Endoh et al. .................. 257/315 |
| 2006/0071301 | A1 * | 4/2006 | Luo et al. ...................... 257/632 |

OTHER PUBLICATIONS

Xu et al., "Double layer inorganic antireflective system for KrF lithography", J. Vac. Sci. Technol. B, vol. 18, Iss. 1, 2000, pp. 127-135.*

* cited by examiner

Primary Examiner — Jennifer C McNeil
Assistant Examiner — Jonathan C Langman
(74) Attorney, Agent, or Firm — Harrity & Harrity, LLP

(57) ABSTRACT

A film stack includes an interlayer dielectric formed over one or more devices. The film stack further includes a first layer having a high extinction coefficient formed on the interlayer dielectric and a second layer having a low extinction coefficient formed on the first layer. The first and second layers prevent ultraviolet induced damage to the one or more devices while minimizing reflectivity for lithographic processes.

16 Claims, 5 Drawing Sheets

US 7,927,723 B1

FILM STACKS TO PREVENT UV-INDUCED DEVICE DAMAGE

TECHNICAL FIELD

The present invention relates generally to semiconductor devices and, more particularly, to film stacks used for preventing ultraviolet induced device damage.

BACKGROUND ART

In many existing semiconductor devices, interlayer dielectrics (ILDs) are formed between different layers of conductors. Subsequent to formation of an ILD, various "backend" processes may be performed to complete the formation of the semiconductor device(s). For example, one such backend process includes etching the ILD to create a via for a contact between the semiconductor devices, or between conductors that interconnect various conductive structures in a semiconductor device. During conventional backend processes, ultraviolet (UV) radiation may induce damage to some types of semiconductor devices, such as, for example, memory devices that are extremely sensitive to UV radiation.

DISCLOSURE OF THE INVENTION

Consistent with aspects of the invention, one or more layers may be formed over a semiconductor device to block UV-induced damage that may occur during backend processes. A first layer of material that has a high extinction coefficient, and a second layer of material that has a low extinction coefficient, may be formed over an ILD. According to one aspect, the first layer may include a material having a high extinction coefficient, such as, for example, a silicon oxynitride (SiON) or a silicon rich oxide (SiRO), and the second layer may include a material having a low extinction coefficient, such as, for example, SiON or SiRO.

Additional advantages and other features of the invention will be set forth in part in the description which follows and, in part, will become apparent to those having ordinary skill in the art upon examination of the following, or may be learned from the practice of the invention. The advantages and features of the invention may be realized and obtained as particularly pointed out in the appended claims.

According to the present invention, the foregoing and other advantages are achieved in part by a film stack formed over a device interlayer dielectric. The film stack may include a first layer of material having a high extinction coefficient and a second layer of material having a low extinction coefficient.

According to another aspect of the invention, a method of forming a film stack for one or more devices to prevent ultraviolet induced damage may include forming a dielectric layer over the one or more devices. The method may further include forming a first layer having a high extinction coefficient over the dielectric layer and forming a second layer having a low extinction coefficient over the first layer.

According to a further aspect of the invention, a film stack may include an interlayer dielectric formed over one or more devices and a first layer having a high extinction coefficient formed on the interlayer dielectric. The film stack may further include a second layer having a low extinction coefficient formed on the first layer, where the first and second layers prevent ultraviolet induced damage to the one or more devices while minimizing reflectivity for lithographic processes.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

BEST MODE FOR CARRYING OUT THE INVENTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Consistent with the present invention, a first layer of material that has a high extinction coefficient, and a second layer of material that has a low extinction coefficient, may be formed over an interlayer dielectric. According to one aspect, the first layer may include high extinction coefficient SiON or SiRO and the second layer may include low extinction coefficient SiON or SiRO. These additional layers may serve to block UV-induced damage that may occur during backend processes.

Figure 1A:
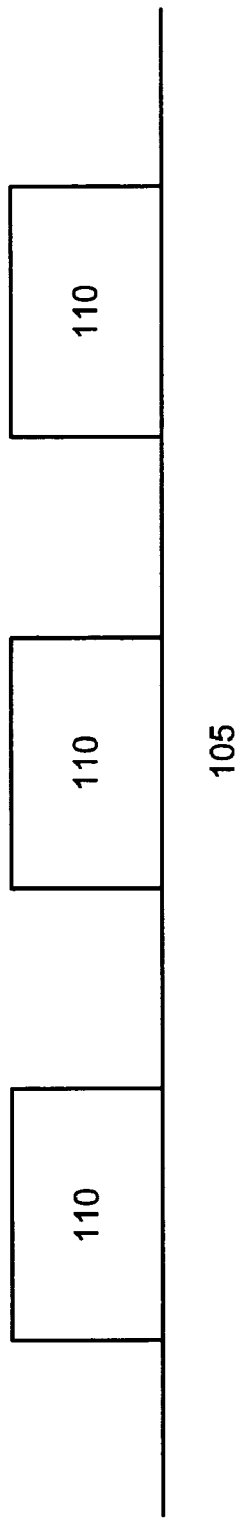
FIG. 1A illustrates devices upon which interlayer dielectric film stacks may be formed consistent with an aspect of the invention.

FIG. 1A illustrates a cross-section of devices 110 formed upon a substrate 105. Each one of devices 110 may include any type of semiconductor device. Such semiconductor devices may include, for example, field effect transistors (FETs), mirror bit logic devices (e.g., mirror bit NOR devices), mass storage devices, or any other type of semiconductor device. Alternatively, each of devices 110 may include an element within a single semiconductor device.

Figure 1B:
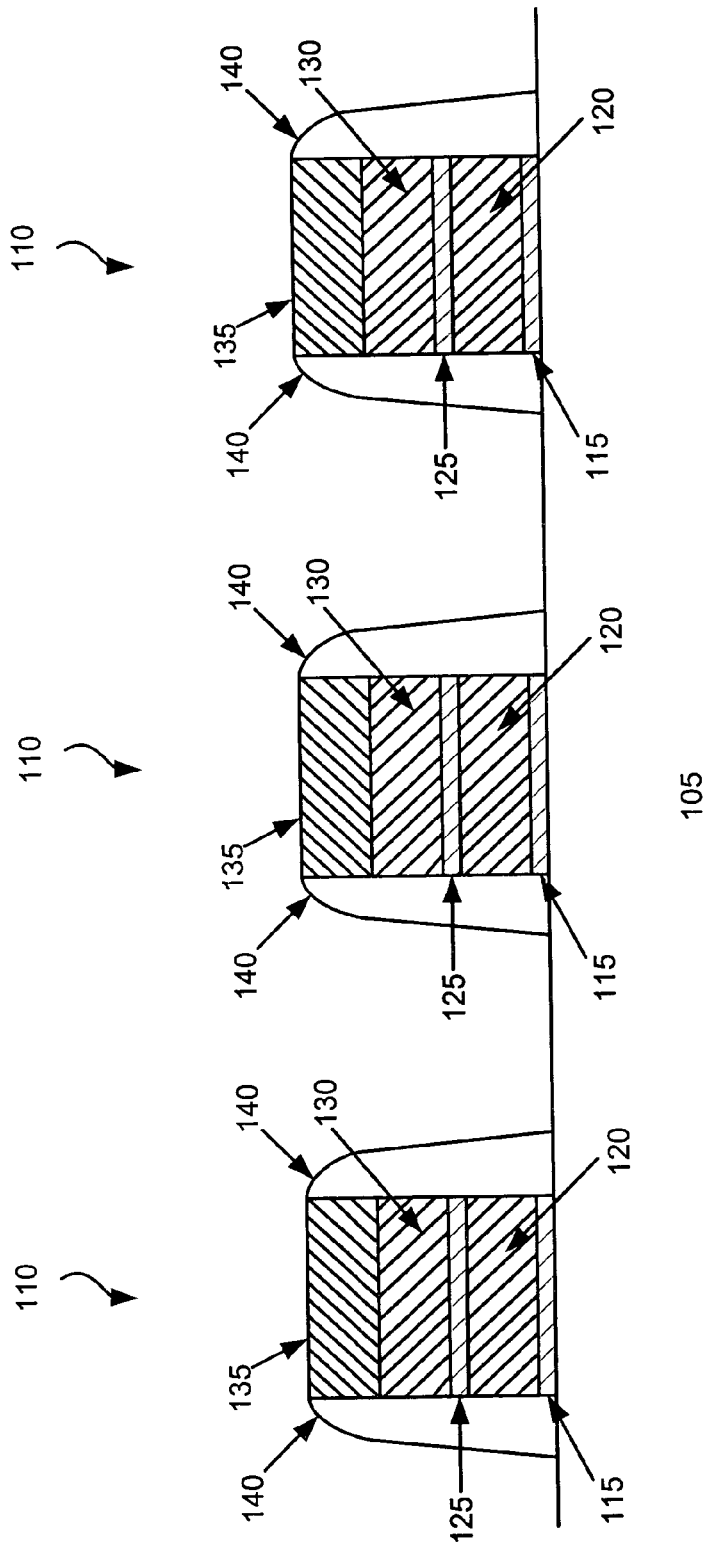
FIG. 1B illustrates further details of a type of exemplary device upon which the interlayer dielectric film stacks may be formed consistent with one implementation of the invention.

FIG. 1B illustrates a cross section of exemplary devices 110 consistent with one implementation of the invention. In this implementation, each of devices 110 may comprise a memory cell that may be used, for example, in a flash memory device. Each memory cell may include a gate oxide layer 115, a floating gate 120, a dielectric layer 125, a control gate 130, a silicide layer 135 and spacers 140.

Gate oxide layer 115 may have a thickness ranging from about 20 Å to about 60 Å and may include dielectric materials such as a silicon oxide or other types of dielectric materials. Floating gate 120 may range in thickness from about 500 Å to about 1200 Å and may include polysilicon, germanium or other types of materials that may be used to store a charge. Dielectric layer 125 may have a thickness ranging from about 80 Å to about 200 Å and may include dielectric materials such as silicon oxide, an ONO stack, or other types of dielectric materials and may function as an inter-gate dielectric for the memory cell.

Control gate 130 may range in thickness from about 1000 Å to about 2000 Å and may include polysilicon, germanium, or other types of semiconducting materials. Silicide layer 135 may optionally be formed on control gate 130 and may range in thickness from about 200 Å to about 500 Å. Silicide layer 135 may include, for example, tungsten silicide. Spacers 140 may be formed on each side of a respective device 110 and may include, for example, a dielectric material.

Figure 2:
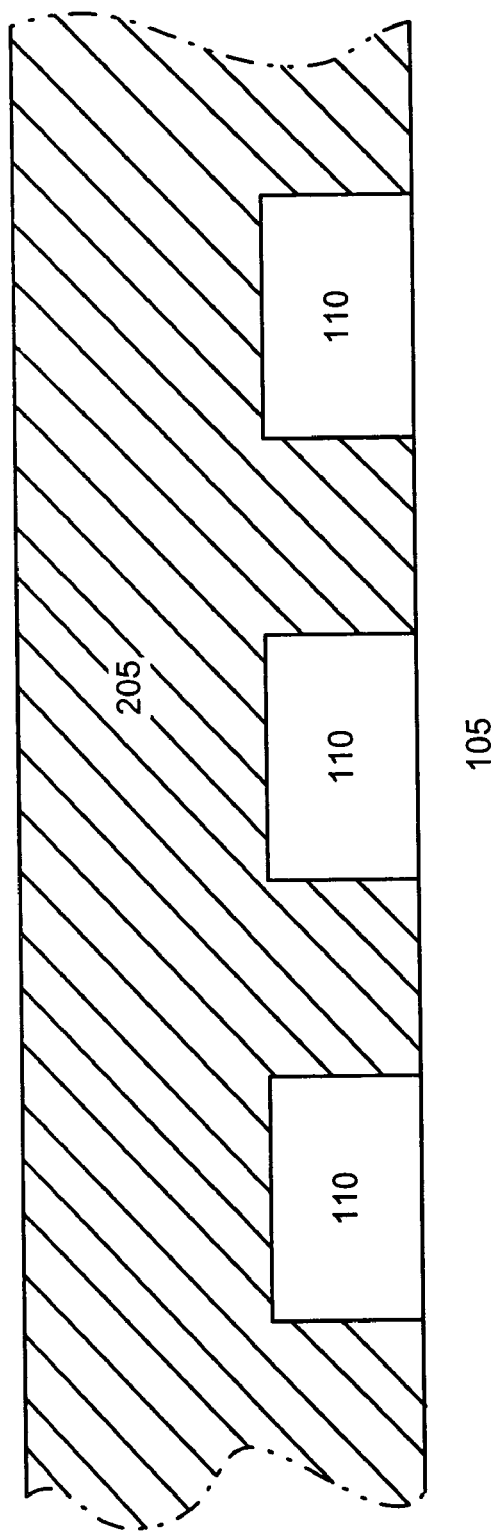
FIG. 2 illustrates an interlayer dielectric (ILD) formed upon the devices of FIG. 1 consistent with the invention.

As shown in FIG. 2, an interlayer dielectric (ILD) 205 may be formed over devices 110. ILD 205 may be formed between different layers of conductors (not shown) used to interconnect different components of a single one of devices 110, or to interconnect different ones of devices 110. ILD 205 may be formed over devices 110 using, for example, existing deposition processes. ILD 205 may include, for example, tetra-ethylorthosilicate (TEOS), or any other dielectric material. In one exemplary implementation, ILD 205 may include a boro-phosphorous TEOS (BPTEOS). The thickness of ILD 205 may vary based on the sizes of devices 110, or based on other design or fabrication parameters. In one exemplary embodiment, the thickness of ILD 205 may range from about 4000 Å to about 10,000 Å. ILD 205 may be polished back to a planar surface using, for example, an existing chemical-mechanical polishing (CMP) process.

Figure 3:
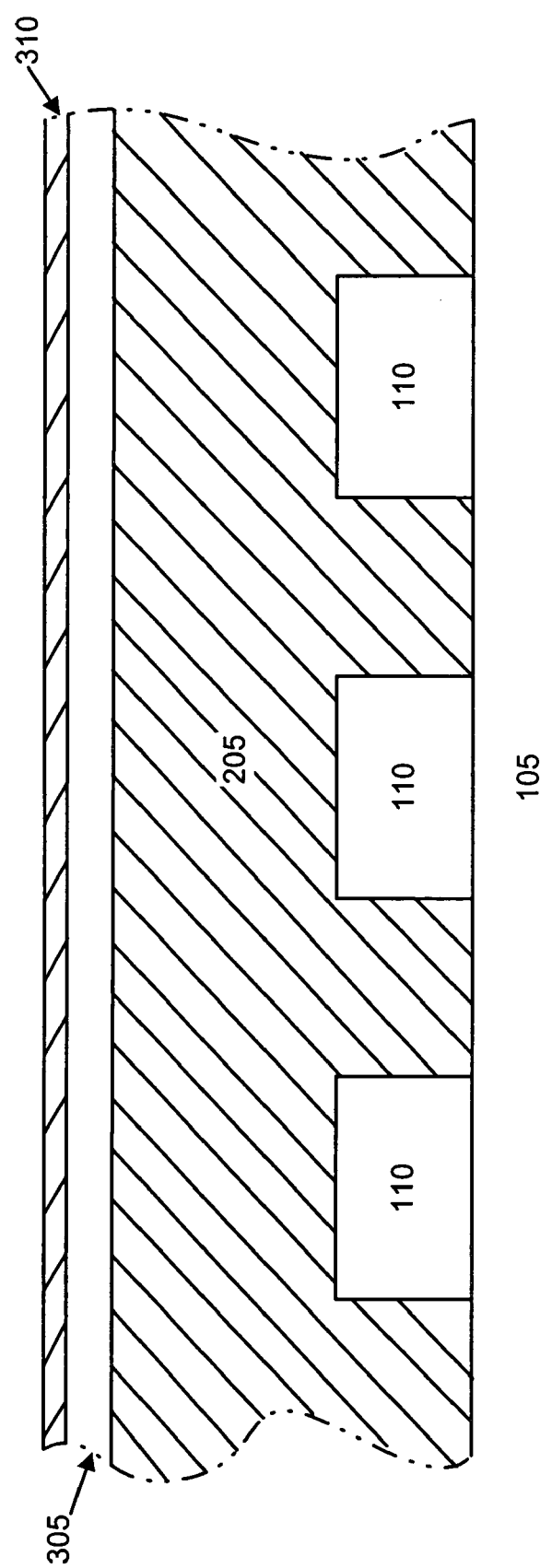
FIG. 3 illustrates the formation of a low extinction coefficient layer and a high extinction coefficient layer upon the ILD of FIG. 2 consistent with the invention.

A layer 305 of material having a high extinction coefficient may be formed on ILD 205, as shown in FIG. 3. As one skilled in the art will recognize, the extinction coefficient includes a sum of the absorption coefficient and the scattering coefficient, where the absorption coefficient measures the attenuation caused by absorption of energy that results from its passage through layer 305 and where the scattering coefficient expresses the attenuation caused by scattering of energy during its passage through layer 305. The extinction coefficient of layer 305 may range from about 0.5 to about 4. Layer 305 may be formed over ILD 205 using, for example, existing deposition processes. The thickness of layer 305 may range from about 300 Å to about 2000 Å. According to one exemplary embodiment, the thickness of layer 305 may be about 1000 Å. In one implementation, layer 305 may include a material having a high extinction coefficient, such as, for example, SiON or SiRO. In such an implementation, the extinction coefficient of layer 305 may range from about 0.8 to about 2.

A layer 310 of material having a low extinction coefficient may be formed over layer 305, as shown in FIG. 3. The extinction coefficient of layer 310 may range from about 0 to about 0.7. Layer 310 may be formed over layer 305 using, for example, existing deposition processes. The thickness of layer 310 may range from about 100 Å to about 1000 Å. According to one exemplary embodiment, the thickness of layer 310 may be about 400 Å. In one implementation, layer 310 may include, for example, SiON. Alternatively layer 310 may include SiRO.

Figure 4:
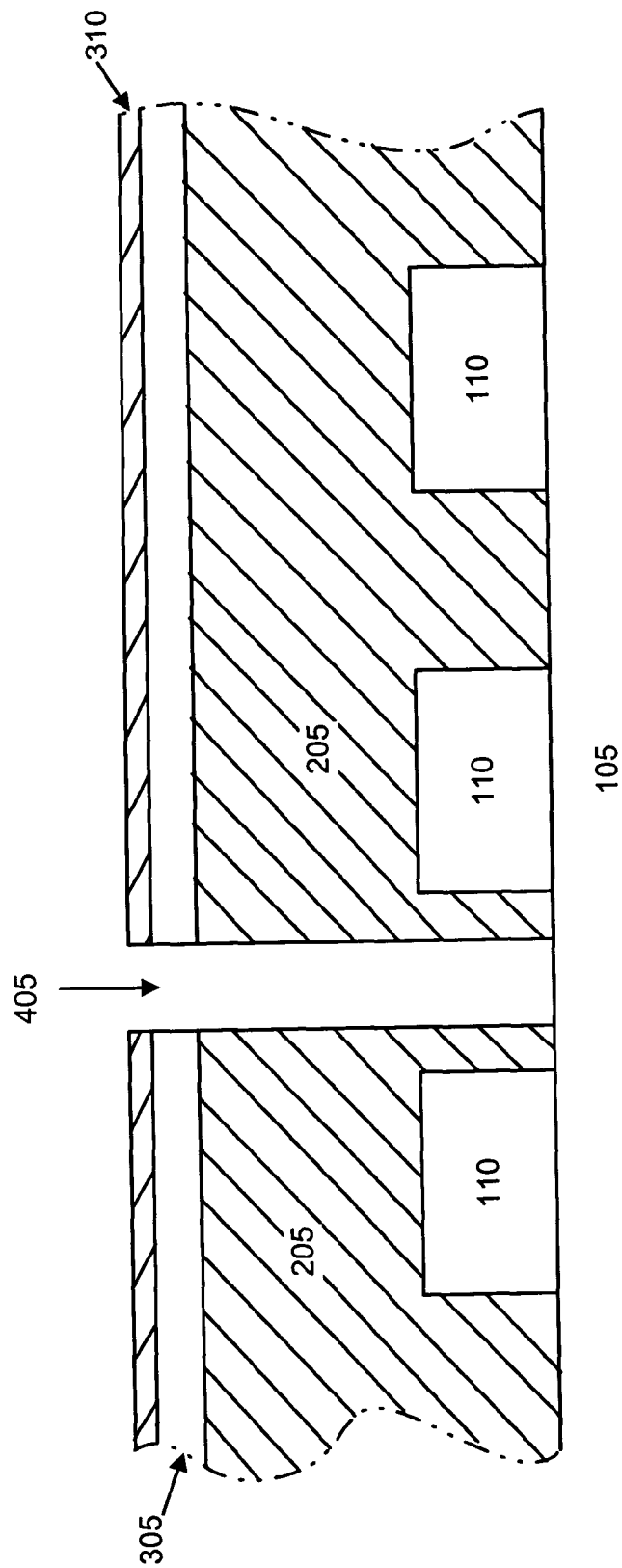
FIG. 4 illustrates an exemplary "backend" process performed on the structure formed in FIG. 3 consistent with the invention.

The formation of layers 305 and 310 over ILD 205 may reduce, or prevent entirely, UV induced damage that may otherwise occur due to subsequently performed "backend" processes while minimizing reflectivity for lithographic processes. Layers 305 and 310 may serve to block incident UV radiation and, thus, prevent incident UV radiation from damaging underlying devices 110. For example, as shown in FIG. 4, layers 305 and 310 may serve to protect devices 110 from UV-induced damage during, and subsequent to, etching of ILD 205 to form a via 405 for a subsequently formed contact. For example, layers 205, 305 and 310 may be etched to form via 405. During the etching, layers 305 and 310 act to protect devices 110, such as underlying memory devices, from UV induced damage. Via 405 may then be filled with a metal to form a contact for interconnecting the various devices 110 or connecting the devices 110 to an external terminal. In some implementations, layers 305 and 310 may be removed subsequent to the "backend" processes.

In the previous descriptions, numerous specific details are set forth, such as specific materials, structures, chemicals, processes, etc., in order to provide a thorough understanding of the present invention. However, the present invention can be practiced without resorting to the details specifically set forth herein. In other instances, well known processing structures have not been described in detail, in order not to unnecessarily obscure the thrust of the present invention. In practicing the present invention, conventional photolithographic, etching and deposition techniques may be employed, and hence, the details of such techniques have not been set forth herein in detail.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, while series of acts has been described above, the order of the acts may vary in other implementations consistent with the present invention.

Only the preferred embodiments of the invention and a few examples of its versatility are shown and described in the present disclosure. It is to be understood that the invention is capable of use in various other combinations and environments and is capable of modifications within the scope of the inventive concept as expressed herein. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A memory device comprising:
   a plurality of memory cells, each memory cell storing two bits of information;
   an interlayer dielectric; and
   a film stack formed over the interlayer dielectric, the film stack comprising:
      a first layer of material having a high extinction coefficient, where the high extinction coefficient ranges from about 0.5 to about 0.9; and
      a second layer of material having a low extinction coefficient, where the low extinction coefficient ranges from about 0 to about 0.2,
      where the first layer comprises silicon rich oxide (SiRO) and where the second layer comprises silicon oxynitride (SiON).

2. The film stack of claim 1, where the first layer has a thickness ranging from about 300 Å to about 2000 Å.

3. The film stack of claim 2, where the second layer has a thickness ranging from about 100 Å to about 1000 Å.

4. The film stack of claim 1, where the first layer has a thickness of about 1000 Å.

5. The film stack of claim 4, where the second layer is formed on the first layer and has a thickness of about 400 Å.

6. The film stack of claim 1, where the first and second layer prevent ultraviolet induced damage to the device.

7. A memory device, comprising:
a plurality of memory cells, each memory cell storing two bits of information;
an interlayer dielectric formed over the plurality of memory cells; and
a film stack formed over the interlayer dielectric, the film stack comprising:
- a first layer having a high extinction coefficient formed on the interlayer dielectric, where the high extinction coefficient ranges from about 2.5 to about 4.0; and
- a second layer having a low extinction coefficient formed on the first layer, where the low extinction coefficient ranges from about 0.55 to about 0.7,
- where the first layer comprises silicon rich oxide (SiRO) and where the second layer comprises silicon oxynitride (SiON), and
- where the first and second layers prevent ultraviolet induced damage to the one or more devices while minimizing reflectivity for lithographic processes.

8. The memory device of claim 7, where the first layer has a thickness ranging from about 300 Å to about 2000 Å.

9. The memory device of claim 8, where the second layer has a thickness ranging from about 100 Å to about 1000 Å.

10. The memory device of claim 7, where the first layer has a thickness of about 1000 Å.

11. The memory device of claim 10, where the second layer is formed on the first layer and has a thickness of about 400 Å.

12. A memory device, comprising:
a plurality of memory cells, each memory cell storing two bits of information;
an interlayer dielectric formed over the plurality of memory cells; and
a film stack formed over the interlayer dielectric, the film stack comprising:
- a first layer having a high extinction coefficient formed on the interlayer dielectric, wherein the high extinction coefficient ranges from about 3.5 to about 4.0; and
- a second layer having a low extinction coefficient formed on the first layer, where the low extinction coefficient ranges from about 0.6 to about 0.7,
- where the first layer comprises silicon rich oxide (SiRO) and where the second layer comprises silicon oxynitride (SiON) and
- where the first and second layers prevent ultraviolet induced damage to the one or more devices while minimizing reflectivity for lithographic processes.

13. The memory device of claim 12, where the first layer has a thickness ranging from about 300 Å to about 2000 Å.

14. The memory device of claim 13, where the second layer has a thickness ranging from about 100 Å to about 1000 Å.

15. The memory device of claim 12, where the first layer has a thickness of about 1000 Å.

16. The memory device of claim 15, where the second layer is formed on the first layer and has a thickness of about 400 Å.

* * * * *